(12) United States Patent
Denavit et al.

(10) Patent No.: US 9,821,524 B2
(45) Date of Patent: Nov. 21, 2017

(54) METHOD FOR MANUFACTURING A TYRE BLANK BY MEANS OF A PLY COMPRISING TWO RUBBERS

(75) Inventors: Franck Denavit, Clermont-Ferrand (FR); Christian Beccavin, Clermont-Ferrand (FR); Michael Petrovich, Clermont-Ferrand (FR); Patrice Monnereau, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 965 days.

(21) Appl. No.: 13/990,917
(22) PCT Filed: Dec. 9, 2011
(86) PCT No.: PCT/FR2011/052926
§ 371 (c)(1),
(2), (4) Date: Aug. 29, 2013

(87) PCT Pub. No.: WO2012/080629
PCT Pub. Date: Jun. 21, 2012

(65) Prior Publication Data
US 2013/0334729 A1 Dec. 19, 2013

(30) Foreign Application Priority Data
Dec. 13, 2010 (FR) .................................... 10 60421

(51) Int. Cl.
*B29D 30/00* (2006.01)
*B29C 47/00* (2006.01)
(Continued)

(52) U.S. Cl.
CPC .......... *B29D 30/0681* (2013.01); *B29C 43/24* (2013.01); *B29C 43/28* (2013.01);
(Continued)

(58) Field of Classification Search
CPC combination set(s) only.
See application file for complete search history.

(56) References Cited

U.S. PATENT DOCUMENTS 1,602,746 A 10/1926 Bowen et al.
1,913,330 A * 6/1933 Brickman ............. B29C 43/265
156/231

(Continued)

FOREIGN PATENT DOCUMENTS

| CN | 1033024 A | 5/1989 | |
|---|---|---|---|
| DE | 10 2007 039 100 A1 | 2/2009 | |
| DE | 102007039100 A1 * | 2/2009 | ............. B29D 30/52 |
| EP | 0 366 773 B1 | 6/1992 | |
| EP | 0 868 991 A1 | 10/1998 | |
| FR | 2 285 990 A1 | 4/1976 | |
| FR | 2 775 220 A1 | 8/1999 | |
| FR | 2 916 383 A1 | 11/2008 | |
| WO | WO 99/61230 A1 | 12/1999 | |
| WO | WO 2009/131578 A1 | 10/2009 | |

*Primary Examiner* — Jeffrey Wollschlager
*Assistant Examiner* — Armand Melendez
(74) *Attorney, Agent, or Firm* — Fitzpatrick, Cella, Harper & Scinto (57) ABSTRACT

A method for manufacturing a raw blank of a tyre includes using a calender to produce a ply. The calender includes two rollers with a gap situated therebetween. A ply that includes a first rubber material is formed in the gap of the calender, with a bead of the first rubber material being formed upstream of the gap. The bead and the gap of the calender are fed with a second rubber material, different from the first rubber material, to form at least one insert in the ply.

6 Claims, 3 Drawing Sheets

(51) Int. Cl.
  *B29D 30/06* (2006.01)
  *B29C 43/24* (2006.01)
  *B29C 43/28* (2006.01)
  *B29C 43/46* (2006.01)
  *B29D 30/52* (2006.01)
  *B29C 47/38* (2006.01)
  *B29C 47/06* (2006.01)
  *B29C 47/32* (2006.01)

(52) U.S. Cl.
  CPC ............ *B29C 43/46* (2013.01); *B29C 47/004* (2013.01); *B29C 47/0021* (2013.01); *B29C 47/064* (2013.01); *B29C 47/32* (2013.01); *B29C 47/385* (2013.01); *B29D 30/52* (2013.01); *B29C 47/0047* (2013.01); *B29D 2030/526* (2013.01)

(56) References Cited

U.S. PATENT DOCUMENTS

| | | | | |
|---|---|---|---|---|
| 2,382,177 | A * | 8/1945 | Schanz | B29C 47/32 264/173.17 |
| 2,539,690 | A | 1/1951 | Boorn | |
| 4,927,482 | A | 5/1990 | Capelle | 156/243 |
| 6,834,693 | B1 * | 12/2004 | Calvar | B29C 47/064 152/152.1 |
| 2006/0102264 | A1 * | 5/2006 | Nicolas | B60C 19/08 152/152.1 |
| 2007/0017615 | A1 * | 1/2007 | Nobuchika | B29D 30/3028 152/152.1 |

* cited by examiner

METHOD FOR MANUFACTURING A TYRE BLANK BY MEANS OF A PLY COMPRISING TWO RUBBERS

FIELD OF THE INVENTION

The invention relates to the manufacture of wheel tyres and in particular the production of the raw blank of the tyre.

BACKGROUND

A tyre of a vehicle wheel comprises notably a tread designed to be in contact with the ground when the vehicle moves. To reduce the rolling resistance of the tyre, it is known practice to add a silica filler to the rubber mixture forming the tread. However, the high silica content that results in the tread makes it a particularly poor conductor of electricity. However, the tyre usually also has the function of placing the vehicle in electrical contact with the ground in order to prevent the build-up of static electricity on board.

In these conditions, in order to maintain an electrical connection between the vehicle and the ground, it is known practice, for example from document FR-2 775 220 to place in the tread an insert comprising a rubber mixture that is a good conductor of electricity. For this purpose, the tread is produced by extrusion of the material that is a poor conductor of electricity and an insert formed of an electrically conductive mixture is inserted by coextrusion into the extrusion channel.

A rubbery material that is a poor conductor of electricity is frequently understood to be a rubber-based material having a resistivity of more than or equal to $10^8$ ohm/cm. Similarly, a rubbery material that is electrically conductive is understood to be a rubber-based material having a resistivity of less than $10^6$ ohms/cm. The function of the insert is to conduct the electrical charges from the radially inner portion of the tread to the radially outer portion in contact with the ground.

It is also possible to manufacture the tread by continuously winding rubber plies of variable width as is described in the publication WO 2009/131578 of the applicant.

However, this document does not describe the means used to place an insert into the tread.

BRIEF DESCRIPTION OF THE INVENTION

One object of the invention is to propose a method and an installation that are easily adaptable to the device as described in the publication cited above and make it possible to produce inserts.

Accordingly, the invention proposes a method for manufacturing a raw tyre blank in which simultaneously:
a calender forms, in a gap situated between two rollers, a ply comprising a first rubber, the calender forming a bead upstream of the gap,
and the bead and the gap are fed with a second rubber having a different compound from that of the first rubber, so as to form, in the ply, at least one insert of the second rubber.

Therefore, the material designed to form the insert is fed upstream of the operation for calendering the ply. Since the second rubber is inserted into the bead of the first rubber designed to form the greater portion of the ply, it is found in this respect that placing the two rubbers in contact at this stage, when the ply does not yet have its definitive shape, does not harm the production of the insert.

The invention also takes advantage of the fact that narrowly complying with the dimensional qualities of the insert is not a critical point of the manufacture. This is why the material that forms it can be inserted into the material of the ply when the latter is not yet calendered.

Furthermore, the method has the advantage of making it possible to preserve the dimensional qualities of the ply. Specifically, the problems posed by the production of a slot and then an insertion into the ply after it has been calendered are avoided.

Advantageously, one of the two rollers supports the first rubber upstream of the gap. Specifically, it is a particularly simple way of carrying the main material of the ply to the gap and of ensuring the thickness of the ply.

Advantageously, upstream of the gap, a layer of the first rubber is separated into two disjointed portions. This separation makes it easier to correctly position the insert in the ply and allows the insert to be apparent on the two faces of the ply.

Advantageously, the second rubber is fed by extrusion.

In one embodiment, it is possible to apply the method such that the insert or one of the inserts appears on at least one main face of the ply.

Preferably, the insert appears on the two main faces of the ply in one and the same section of the ply in a plane perpendicular to a longitudinal direction of the ply.

In another particular embodiment, it is possible to apply the method such that the insert or each insert appears on a single main face of the ply.

Preferably, the first rubber has a resistivity greater than or equal to $10^8$ ohms/cm and the second rubber a resistivity of less than or equal to $10^6$ ohms/cm.

Also proposed according to the invention is a raw blank of a tyre which results from the application of the method according to the invention.

Also proposed according to the invention is a wheel tyre that has been produced from such a blank.

Finally, the invention proposes an installation for manufacturing a raw blank of a tyre, the installation comprising:
a calender comprising at least two rollers forming a gap,
first means for feeding the gap with rubber, which means being arranged such that the gap forms a rubber ply and that the calender forms a bead upstream of the gap, and
second means for feeding the gap and the bead with rubber, which means being independent of the first means and arranged so as to form at least one insert in the ply.

Preferably, the calender comprises at least three rollers, the two rollers forming the gap being the rollers furthest downstream. Therefore, it is at the last stage of forming the ply that the insertion of the second rubber takes place. The positioning of the latter within the ply and the shape of the latter are therefore preserved.

Preferably, the installation comprises upstream of the gap a forestem contiguous with one of the rollers and independent of the second rubber-feeding means. Because of this independence, it is possible to position the forestem in the most appropriate location.

Advantageously, the installation comprises a member capable of detecting that a layer of rubber forms two disjointed portions downstream of the forestem and upstream of the gap. This ensures that the slot is appropriately produced and therefore capable of receiving the insert in good conditions. If necessary also, it ensures that the insert will be visible on at least one of the faces of the ply.

Preferably, the second feeding means comprise an extrusion nozzle.

Advantageously, the nozzle supports a forestem.

When the aforementioned upstream forestem is absent, the forestem of the nozzle allows the production of the slot to receive the insert. Conversely, when the upstream forestem is present, the forestem of the nozzle, as a redundant element, prevents the slot from reclosing.

It is possible to provide that the nozzle has an orifice opening in the direction of the gap.

Preferably, the nozzle has an orifice opening in the direction of at least one of the rollers in an orientation radial to a rotation axis of the roller. This thus promotes the production of an insert appearing on at least one main face of the ply, and even on each of them.

Preferably, the nozzle comprises a body and a mouth forming an outlet orifice for the rubber and extending in protrusion from a lateral face of the body, preferably on either side of the latter. Thus the body of the nozzle does not interfere with the rubber fed by the first means.

Preferably, the nozzle extends entirely at a very slight distance from the gap without coming into contact with one of the rollers.

Preferably, the installation comprises a member capable of detecting an electric current passing through a thickness of the ply. This provides verification that the second rubber, as the case may be, is clearly capable of allowing the electrical charges to be discharged through the ply.

Preferably, the installation comprises at least one member capable of detecting a difference in colours between portions of a face of the ply. On this occasion it is therefore an optical inspection which makes it possible to ensure that the insert appears on at least one of the faces.

These two members, which may be provided redundantly, each make it possible to verify the correct positioning of the insert in the ply once the latter is formed.

BRIEF DESCRIPTION OF THE DRAWINGS

Other features and advantages of the invention will also appear in the following description of an embodiment given as a non-limiting example with reference to the appended drawings in which.

DETAILED DESCRIPTION OF THE INVENTION

FIGS. 1 to 5 illustrate an installation for the production of wheel tyres and used more precisely for the production of a raw blank of the tyre.

The tyre is for example a wheel tyre of a passenger vehicle, of a light vehicle, of a utility vehicle, of a vehicle of the heavy-goods type or else a wheel of a construction machine.

The installation 2 makes it possible to produce a ply 4 or skim designed to form, by winding, the raw blank of a tread.

Figure 6:
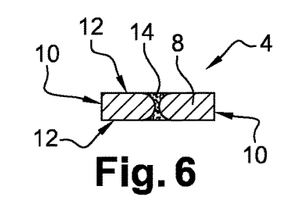
FIGS. 6 to 11 are views in section in a plane perpendicular to the longitudinal direction of the ply, showing six respective exemplary embodiments of the latter.

It is assumed first of all that the installation 2 is designed to produce the ply 4 by giving it a cross section in a plane perpendicular to its longitudinal direction which is that illustrated in FIG. 6. The ply has a profiled shape such that its section is reproduced identically along the ply.

The ply 4 comprises a main body 8 made of a first rubber and forming notably the whole of the two lateral edges 10 of the ply and the largest proportion of its main upper and lower faces 12.

The ply also comprises an insert 14 formed by a thread made of a second rubber, usually conductive of electricity. The insert extends in the ply in the longitudinal direction of the latter and along a rectilinear axis. In this instance, the insert extends halfway from the lateral edges 10. The insert and the ply are both centrally symmetrical, the centre of symmetry being on the middle fibre of the ply. It will be understood nevertheless that this embodiment is not obligatory and that the insert may be situated axially at any location in the ply provided that its position is constant so as to allow the superposition of the electrically conductive rubber layers on each winding.

In this instance has the shape of a diabolo or a bulbous shape so that the width of the insert is at its minimum in the centre of the ply. The insert 14 is visible here on the two main faces 12 of the ply which it partially constitutes. It extends continuously from one to the other of the latter along the thickness of the ply.

The ply 4 has for example a thickness of between 0.5 and 2 mm. The total width of the insert is for example between 1 and 10 mm. The first and second rubbers are each formed by a mixture comprising natural rubber, synthetic rubber, oil and various additives. In this instance, the two mixtures differ at least due to the fact that the first rubber comprises a silica reinforcing filler, a filler which is absent from the second rubber or at least in a much smaller proportion in the latter than in the former. The first rubber is therefore much worse at conducting electricity than the second.

Figure 1:
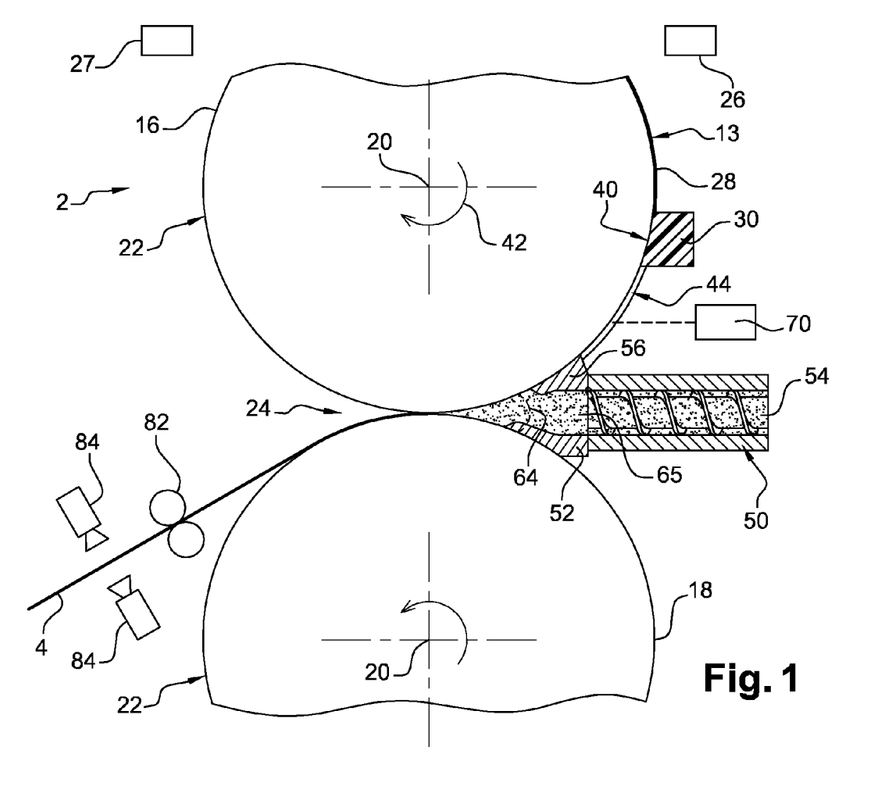
FIG. 1 is a view in vertical section of an installation according to the invention, the section being made in a plane perpendicular to the rotation axis of the rollers of the calender.

The installation 2 will now be described. The latter comprises a calender 13 comprising several rollers or cylinders, including two rollers, respectively an upper roller 16 and a lower roller 18, which have been illustrated in the figures. The calender comprises other rollers feeding the calender with rubber but the latter have not been illustrated.

The two rollers 16 and 18 form the rollers of the calender that are situated furthest downstream with reference to the direction of travel of the rubber and of the ply in the installation. They have parallel, horizontal rotation axes 20 and cylindrical outer faces 22 with a circular section in a plane perpendicular to the axis 20. The two rollers are in this instance identical with one another and are placed with their faces 22 facing one another so as to form between them a gap 24 in the location where the distance between the two rollers is minimal. The rollers 16 and 18 rotate in directions contrary to one another.

The installation 2 is arranged so that the distance separating the two axes 20 is adjustable, as is, in consequence, the height of the gap 24, which makes it possible to choose the thickness that it is desired to give to the ply 4. In this instance, provision is made for the axis 20 of the upper roller 14 to be mounted fixedly to slide on a frame 27 of the machine while that of the other roller 18 is mounted movably to slide vertically relative to the frame in order to allow this adjustment.

The installation 2 comprises means 26, which have not been illustrated in detail, comprising for example one or more rollers and designed to allow the feeding of the roller 16 with the first rubber. In this instance, this feeding is carried out so that the first rubber is brought to the gap 24 only by the first roller 16 in the form of a layer 28 applied against the face 22, of constant width and thickness.

Figure 4:
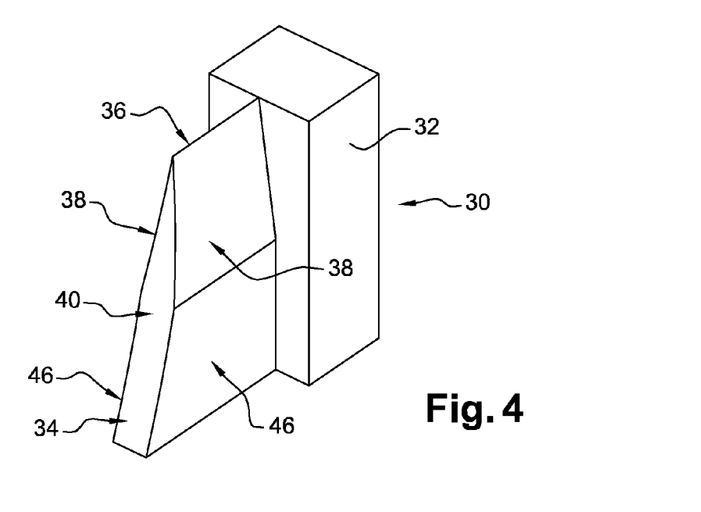
FIGS. 4 and 5 are views in perspective respectively of the upstream forestem and of the nozzle of the installation of FIG. 1.

The installation 2, in the present example, comprises a forestem 30 shown in particular in FIG. 4. The forestem is connected to the frame of the installation by means not shown which make it possible to give the forestem a fixed position relative to the frame. These means nevertheless make it possible to adjust this position depending on the particular features of the production. The forestem 30 comprises a body 32 by means of which it is connected to the frame.

It also comprises a blade 34 having a horizontal, rectilinear, upper cutting edge 36 radial to the axis 20. This edge is defined by the intersection of two flat upper faces 38 of the blade. The blade 34 has a concave, cylindrical front face 40 having a radius of curvature equal to that of the convex face 22 of the upper roller 16. The forestem rests against the roller in a direction radial to the axis 20 so that the face 40 comes into surface contact with the face 22, the faces being concentric.

Advantageously provision is made for the means of connecting the forestem to the frame to make it possible to adjust the intensity of the pressure associated with this contact. The forestem is made of a plastic or a metal and is preferably configured so that the face 40 can be deformed slightly to appropriately adopt the shape of the face 22. Since the forestem is held in a fixed position relative to the frame during the rotation of the roller 16 as indicated by the arrow 42, it rubs the surface of the roller lightly.

In operation, the blade of the forestem 30 cleaves the layer of rubber 28 in order to produce a furrow 44 therein, passing through the whole thickness of the latter in the direction radial to the axis 20. The upstream portion of the blade has a V-shaped profile in a plane tangential to the face 22 in order to give a symmetrical configuration to the edges of the furrow 44. The faces 38 of the blade that are inclined relative to each other are extended by flat faces 46 parallel to each other and making it possible to prevent the furrow from reclosing after the layer 28 has gone past the upstream forestem 30. The width of the furrow is equal to that of the blade. The blade 34 has, in the direction radial to the axis 20, a sufficient dimension for the body 32 not to be in contact with the layer 28.

Downstream of the forestem 30, the face 22 of the roller is visible at the bottom of the furrow and in that position is free from any trace of the first rubber so that the layer is perfectly split into two distinct portions. This results from the factor that the forestem rubs against the surface of the roller 22. As will be seen below, it is therefore possible to place the insert 14 in the furrow 44 in a symmetrical configuration so that it appears on the two main faces of the ply.

The installation 2 comprises an extrusion tool 50 supporting at its downstream end a nozzle 52 fed by the tool with the second rubber. The tool 50 notably comprises a set screw 54 extending along an axis which is also its rotation axis. In the case that is used to support the present description, this axis is, in this instance, horizontal and passes geometrically through the gap 24, but any other arrangement is also possible.

Figure 5:
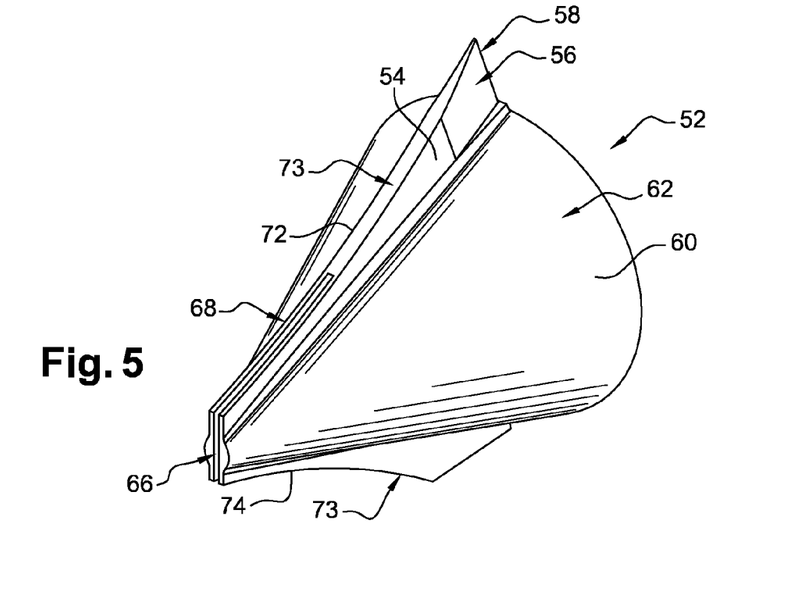

The nozzle 52, illustrated in particular in FIG. 5, also comprises in the present example a forestem 54 supporting an upstream blade 56. The nozzle comprises a body 60 which has an outer face 62, in this instance of conical shape coaxial with the screw 54. The forestem 54 extends in protrusion from the face 60 in the direction radial to the axis of the roller 20.

The forestem has a shape similar to that of the blade 34 of the forestem 30. It therefore has a rectilinear cutting edge 58 radial to the axis 20 and defined by two inclined faces. Since the forestem 54 extends downstream of the forestem 30, their two cutting edges radial to the axis 20 are not parallel with each other. In this instance, the downstream forestem 54 has a width in the direction of the axis 20, in this instance 2.5 millimeters, that is less than that of the upstream blade 34. Specifically, its function is not to produce a furrow but solely to appropriately keep the furrow 44 open. For this purpose, the two blades extend in the same plane.

The function of the nozzle 52 is to inject the second rubber into the gap and into a bead 64 formed by the first rubber upstream of the gap 24 in contact with the rollers. It has an inner cavity 65 placing the downstream end of the extrusion tool 50 in communication with an orifice 66 of the nozzle. This orifice is defined in this instance by an extrusion mouth 68 formed by two raised elements 72 and 74 extending in protrusion from the face 62 of the body, on either side of the axis of the latter.

Each of the raised elements extends in a rectilinear manner along a generatrix of the cone, the two raised elements being diametrically opposed on either side of the axis of the cone. The upper raised element 72 defines not only a portion of the orifice 66 but also the forestem 54. The two raised elements 72, 74 have on their free-end longitudinal faces a rectilinear slot defining the orifice 66.

The front end of the nozzle is formed by a vertical truncated face forming the end of the raised elements 72 and 74 and blunting the point of the cone. The two slots join together at this end where the orifice extends in a rectilinear, vertical configuration. The orifice 66 is therefore formed continuously in three portions, namely one rectilinear, vertical portion at the front of the nozzle and two elongate portions situated respectively above and below the nozzle. The orifice 66 therefore opens both in the direction of the gap 24 and, independently of this, on the two raised elements, in the direction of each of the rollers in an orientation radial to the axis 20 of the corresponding roller. The width of the orifice 66 depends on the width and on the shape that it is wished to give to the insert 14. It is for example 1 millimeter.

Just like the front face 40 of the forestem 30, the end faces 73 of the raised elements 72 and 74 are designed to make surface contact against the faces 22 of the respective rollers 16 and 18 with which they are concentric. They therefore have a cylindrical concave shape allowing a surface contact with the corresponding face 22. A slight clearance is provided between these faces and the rollers. In this instance, this clearance is 0.1 millimeter between the upper raised element 72 and the upper roller 16 and the clearance of the lower raised element 74 with the lower roller 18 is designed to be variable, for example of 1 millimeter, since the height of the gap 24 is also 1 millimeter.

The second rubber is brought by the extrusion tool 50 into the cavity 65 of the nozzle 52 and leaves it through the upper, lower and front portions of the orifice 66. Therefore, it comes into contact with the rollers 16 and 18 even before entering the bead 64, which makes it possible to form a continuous thread of the second rubber in the whole thickness of the first rubber.

The nozzle 52 extends entirely at a distance from the gap 24. The distance d between these two elements, illustrated in FIG. 2, has two functions. The first is to ensure the cohesion of the mixture forming the first rubber with the mixture forming the second rubber by virtue of the pressure generated in the bead 64. The second is to allow this bead to reclose for the purpose of obtaining a ply 4 that is flat and of calibrated thickness when the injection of the second rubber is stopped while continuing the manufacture of the ply with the feeding of the first rubber.

Figure 2:
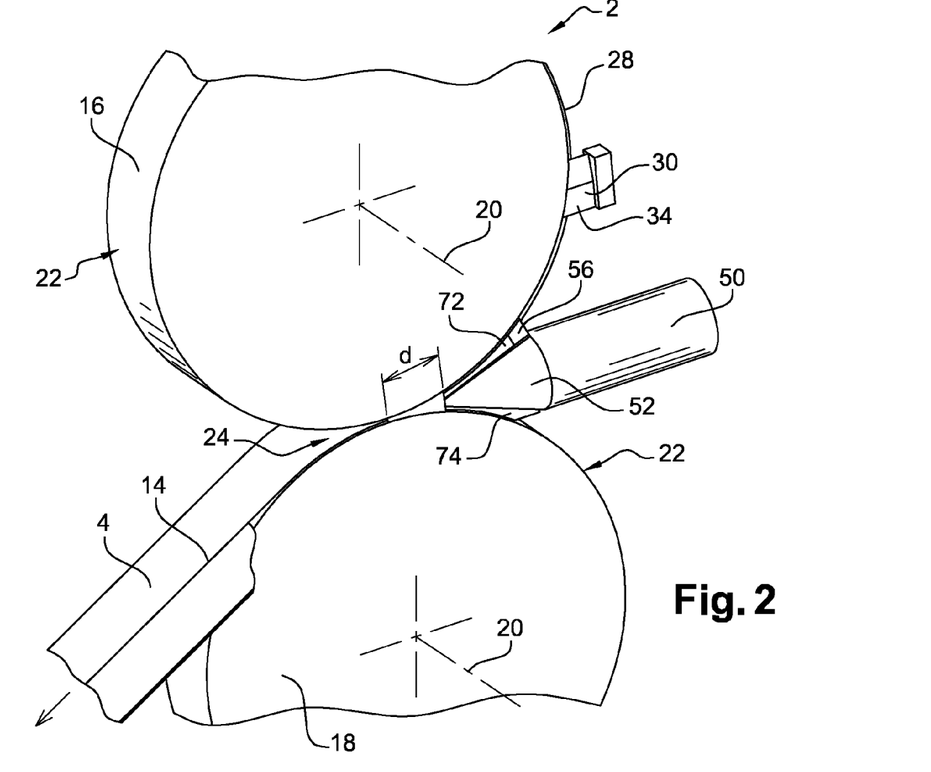
FIGS. 2 and 3 are views in perspective respectively of the front and rear of the nozzle of the installation of FIG. 1.
Figure 3:
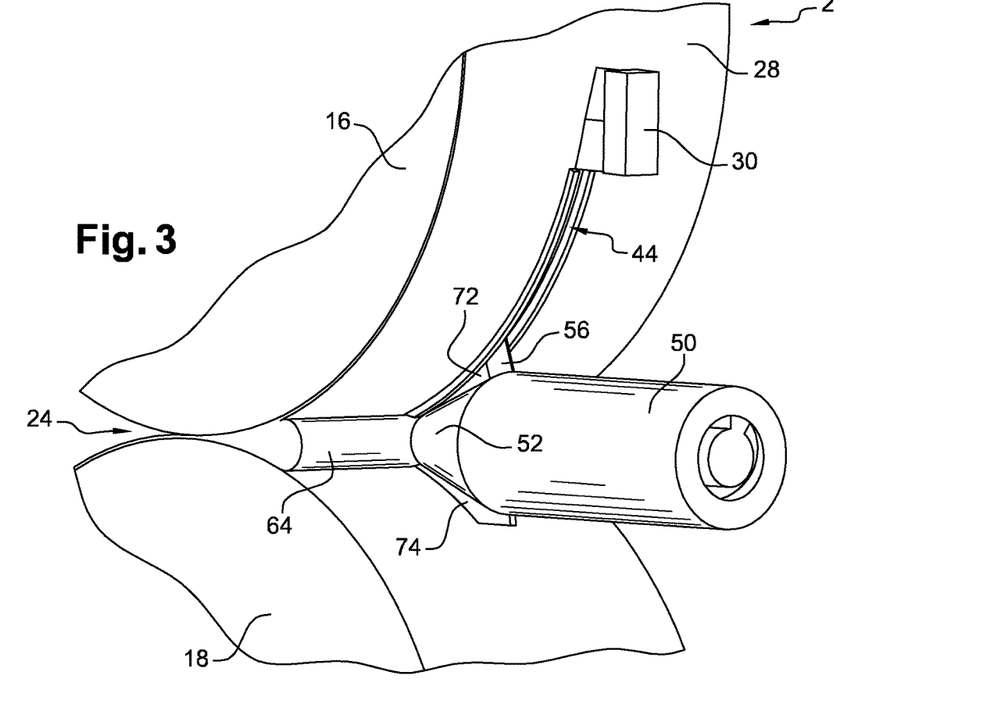

Because the orifice 66 is defined by a mouth extending in protrusion from the face 62, the nozzle has a minimal contact surface with the bead 64 and has no portion likely to cause retentions of the second rubber. This prevents problems of adhesion and of retention of the second rubber on the nozzle.

As a variant, it is possible to coat the outer face 62 of the nozzle with a non-adhesive material or else a material causing the second rubber to slip on the nozzle.

It is possible to make provision for the forestem 30 and the nozzle 52 to be thermally regulated and furnished for example with heating means making it possible to heat the rubber to keep it at a temperature promoting the production of the ply.

During manufacture, the nozzle therefore achieves the insertion of the second rubber in the furrow 44 formed within the first. Manufacturing takes place continuously so that the two rubbers are continuously and simultaneously brought to the gap.

During the passage between the rollers 16 and 18, the two rubbers are formed in the gap in order to give its shape to the ply 4 when exiting the calender. Manufacturing can be carried out at various speeds. The ply 4 may be produced for example at a speed of between 5 and 80 meters per minute or more.

The installation comprises control means capable notably of synchronizing the flow rate of the second rubber supplied to the calender depending on the speed of feeding of the first rubber and on the speed of emergence of the ply.

As a variant, it is possible to dispense with providing the upstream forestem 30 so that the creation of the furrow is carried out by the forestem 54 of the nozzle 52. It is then preferable for the latter to be in contact with the roller 16 and pressed against its face 22 with sufficient force.

Illustrated in FIGS. 7 to 11 are various configurations of the ply 4 and of the insert or inserts 14 that it comprises. In the rest of the description, the profiles indicated are, as before, profiles in a transverse plane perpendicular to a longitudinal direction of the ply.

Figure 7:
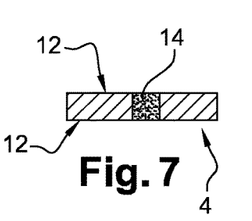

Therefore, in FIG. 7, the insert 14 has a rectangular profile, in this instance square, two of the faces of the rectangle being indistinguishable from the faces 12 of the ply.

Figure 8:
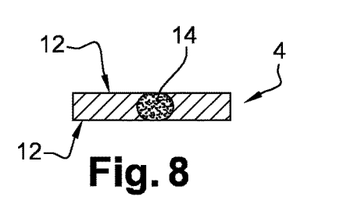

In FIG. 8, the insert 14 has an oval or elliptical profile, the large axis of the ellipse being parallel to the faces 12 and situated halfway from the latter. The section of the thread is tangential to the two main faces 12.

Figure 9:
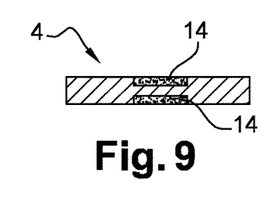

In FIG. 9, not one but two inserts 14 are inserted into the first material of the ply. Each insert in this instance has a rectangular profile. One of the faces of the rectangle is indistinguishable from a respective face 12. Therefore, the inserts each appear on one of the respective faces 12 of the ply. However, the two inserts are not in contact with each other so that they extend at a distance from each other.

Figure 10:
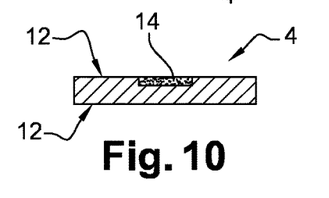

In the ply of FIG. 10, only one insert is provided which appears on only one main face 12 of the ply. The other face is wholly defined by the first rubber. The insert has, for example, a profile of rectangular shape.

In the embodiment of FIG. 9, the insert has a section of circular shape, the circle being tangential to the two main faces 12.

Figure 11:
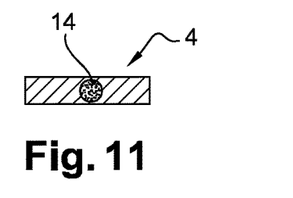

In the embodiments of FIGS. 6, 7, 8, 10 and 11, it is therefore a single insert that is provided within the ply. The single insert appears on each of the two faces in the embodiments of FIGS. 6, 7, 8 and 11. The or each insert appears only on one of the two faces in the embodiments of FIGS. 9 and 10. Therefore, the embodiments of FIGS. 6 to 8 are called through inserts, and those of FIGS. 9 to 11 are called non-through inserts. In all these embodiments, the or each insert extends wholly at a distance from the lateral edges 10.

It is possible to furnish the installation with members making it possible to verify that the insert is through or visible on one of the two faces of the ply. Each of these members makes it possible to carry out a continuous inspection during manufacture.

Therefore, the installation 2 comprises in this instance an optical detector 70 positioned downstream of the forestem 30 and upstream of the nozzle 52. It has an optical member directed towards the roller face 22 in a radial direction in the furrow 44 in order to verify that the roller is free of any trace of rubber at the bottom of the furrow. This detector makes it possible for example to ensure that the second rubber will be appropriately visible on the upper face of the ply on leaving the calender.

The installation also comprises an inspection device 82 situated downstream of the rollers 16 and 18. This device is furnished with two small wheels having rotation axes parallel to the axes 20 and in contact with the respective faces 12 of the ply. This device is capable of measuring an electrical resistance of the ply, for example of the insert 14 when it is in through configuration, by having an electrical current passed into the ply along its thickness. The device makes it possible for example to verify, as the case may be, that the insert extends into the whole thickness of a same section of the ply.

The installation 2 also comprises two video cameras 84 aiming at the respective main faces of the ply, downstream of the calender, in this instance downstream of the detector 82. Each of these cameras is capable is detecting a difference in tone or in colour between two different zones of the face 12 that it observes. This detector is useful when the thread appears on the face with a difference in tone relative to the rest of the face. It thus makes it possible to verify that the thread appears appropriately on the face in question.

Figure 12:
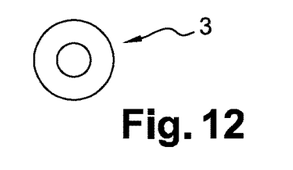
FIGS. 12 and 13 are two views showing respectively a raw blank and a tyre which are obtained by means of the method of the invention.
Figure 13:
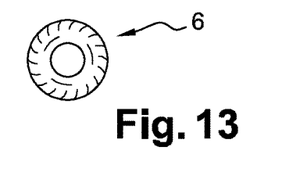

The ply 4 is designed to be wound onto the blank 3 of the tyre during production, illustrated in FIG. 12, in several turns so as to form several layers of ply placed one beside another and/or one on top of another. These layers are sometimes juxtaposed, sometimes in partial superposition, sometimes in total superposition. This is how at least a portion of the tread of the tyre 6 designed to be in contact with the ground when the vehicle is running is produced. The superposition of the ply ensures that the insert is placed in contact with itself in the various segments that follow one another in the radial direction with reference to the main axis of the tyre. This contact will allow a discharge of the electrical charges in the same direction.

The raw blank is then notably the subject of a curing step for the vulcanization of the rubber and the obtaining of the tyre.

The invention may be used to form only a portion of the tread, this portion being able to be an inner portion, the electrical contact between this portion and the outer face of the tyre being provided by other means. The invention may also be used to produce an outer portion of the tread.

This installation and the production method that it uses are particularly advantageous when the second rubber is a better conductor of electricity than the first while, unlike the latter, having little or no silica filler. The invention may nevertheless be used when the two rubbers have different formulations but nevertheless do not have substantial differences of electrical conductivity.

Naturally, it is possible to make many modifications to the invention without departing from its context.

The invention claimed is:

1. A method for manufacturing a raw blank of a tyre, the method comprising steps of:
   utilizing a calender to form a ply that includes a first raw rubber material, wherein the calender includes two rollers and a gap situated between the two rollers, and wherein the calender forms the ply using the gap between the two rollers and forms a bead upstream of the gap between the two rollers in a layer of the first raw rubber material;
   separating the layer of the first rubber material into two disjoined portions using a forestem contiguous with one of the two rollers upstream of the gap between the two rollers; and
   simultaneously with the utilizing step, injecting a second raw rubber material between the two disjoined portions of the layer of the first raw rubber material of the bead and into the gap between the two rollers, the second raw rubber material being different from the first raw rubber material, to produce at least one insert of the second raw rubber material in the ply,
   wherein the forestem used for the separating of the layer of the first rubber material is independent from an injector used for the injecting of the second raw rubber material.

2. The method according to claim 1, one roller of the two rollers supports the first rubber material upstream of the gap.

3. The method according to claim 1, wherein the injecting step feeds the second rubber material by extrusion.

4. The method according to claim 1, wherein
   the ply includes two main faces, and
   the at least one insert appears on a first of the two main faces of the ply in a plane perpendicular to a longitudinal direction of the ply.

5. The method according to claim 1, wherein
   the ply includes two main faces,
   a first of the at least one insert appears on a first of the two main faces of the ply,
   a second of the at least one insert appears on a second of the two main faces of the ply, and
   the first and second inserts appear in a same section of the ply in respective planes perpendicular to a longitudinal direction of the ply.

6. The method according to claim 1, wherein
   the first rubber material has a resistivity greater than or equal to 108 ohms/cm, and
   the second rubber material has a resistivity less than or equal to 106 ohms/cm.

* * * * *

UNITED STATES PATENT AND TRADEMARK OFFICE
CERTIFICATE OF CORRECTION

PATENT NO. : 9,821,524 B2  
APPLICATION NO. : 13/990917  
DATED : November 21, 2017  
INVENTOR(S) : Franck Denavit Page 1 of 1

It is certified that error appears in the above-identified patent and that said Letters Patent is hereby corrected as shown below:

In the Specification

Column 4
Line 29, "instance has" should read --instance the insert 14 has--.

Column 5
Line 30, "Advantageously" should read --Advantageously,--.

Column 8
Line 49, "capable is" should read --capable of--.

In the Claims

Column 10
Line 10, "one" should read --wherein one--.
Line 30, "108 ohms/cm" should read --$10^8$ ohms/cm--.
Line 32, "106 ohms/cm" should read --$10^6$ ohms/cm--.

Signed and Sealed this  
Twenty-fourth Day of April, 2018

Andrei Iancu  
*Director of the United States Patent and Trademark Office*